US012789273B2

(12) United States Patent
Novalinski et al.

(10) Patent No.: US 12,789,273 B2
(45) Date of Patent: Nov. 10, 2026

(54) CUTTING TOOL ASSEMBLIES, FACE MILLS, AND RELATED METHODS

(71) Applicant: ENGIS CORPORATION, Wheeling, IL (US)

(72) Inventors: David Novalinski, Palatine, IL (US); Craig T. Hoeppner, Bolingbrook, IL (US); Erick Robles, Round Lake Beach, IL (US)

(73) Assignee: ENGIS CORPORATION, Wheeling, IL (US)

( * ) Notice: Subject to any disclaimer, the term of this patent is extended or adjusted under 35 U.S.C. 154(b) by 401 days.

(21) Appl. No.: 18/521,894

(22) Filed: Nov. 28, 2023

(65) Prior Publication Data

US 2025/0091141 A1 Mar. 20, 2025

Related U.S. Application Data

(60) Provisional application No. 63/539,428, filed on Sep. 20, 2023.

(51) Int. Cl.
*B23C 5/28* (2006.01)
*B23C 5/00* (2006.01)

(52) U.S. Cl.
CPC ................ *B23C 5/28* (2013.01); *B23C 5/006* (2013.01); *B23C 2250/12* (2013.01)

(58) Field of Classification Search
CPC .......... B23C 5/28; B23C 5/06; B23C 2250/12
See application file for complete search history.

(56) References Cited

U.S. PATENT DOCUMENTS

| | | | | |
|---|---|---|---|---|
| D329,439 S | 9/1992 | Gustafsson et al. | | |
| D481,045 S | 10/2003 | Ahn | | |
| D794,101 S | 8/2017 | Ryu | | |
| D805,565 S | 12/2017 | Min | | |
| D834,074 S | 11/2018 | Palushaj | | |
| D848,496 S | 5/2019 | Maeta | | |
| D872,143 S | 1/2020 | Wiand | | |
| D909,437 S | 2/2021 | Sorai | | |
| D952,714 S | 5/2022 | Flodman | | |
| D953,396 S | 5/2022 | Shin | | |
| D1,037,327 S | 7/2024 | Shimamoto | | |
| D1,051,961 S | 11/2024 | Liao | | |
| 2009/0214305 A1* | 8/2009 | Waggle | B23C 5/06 | 407/48 |

(Continued)

FOREIGN PATENT DOCUMENTS

JP 2010094748 A * 4/2010 ............... B23C 5/28

OTHER PUBLICATIONS

Machine translation of JP-2010094748-A (Year: 2010).*

(Continued)

*Primary Examiner* — Kyle A Cook
(74) *Attorney, Agent, or Firm* — MARSHALL, GERSTEIN & BORUN LLP

(57) ABSTRACT

Cutting tool assemblies, end mills, and related methods are disclosed. In accordance with an implementation, a face mill includes a cylindrical body including a central bore, a plurality of face mill coolant passages fluidly coupled to the central bore, and a cutting face. The cutting face includes a plurality of radially spaced teeth and gaps between the teeth. Each face mill coolant passage includes an opening at a corresponding gap.

20 Claims, 11 Drawing Sheets

(56) References Cited

U.S. PATENT DOCUMENTS

| | | | | |
|---|---|---|---|---|
| 2011/0020080 | A1* | 1/2011 | Zettler | B23C 5/06 407/113 |
| 2012/0230781 | A1* | 9/2012 | Hoffer | B23Q 11/1023 407/11 |
| 2016/0074948 | A1* | 3/2016 | Dudzinsky | B23C 5/006 407/11 |
| 2019/0247926 | A1* | 8/2019 | Fang | B23B 27/16 |
| 2021/0220956 | A1* | 7/2021 | Fang | B23C 5/109 |
| 2021/0354214 | A1 | 11/2021 | Chen | |
| 2022/0260972 | A1* | 8/2022 | Matsuda | B23Q 15/18 |
| 2022/0324037 | A1* | 10/2022 | Gangstad | B23C 5/26 |
| 2023/0130145 | A1* | 4/2023 | Noland | B23C 5/1009 407/54 |
| 2023/0330759 | A1* | 10/2023 | Miura | B23C 5/06 |
| 2024/0207946 | A1 | 6/2024 | Kubo | |

OTHER PUBLICATIONS

"Engls Corporation—International Manufacturing Technology Show," (2024). Internet URL: https://directory.imts.com/8 0/exhibitor/00001435/Engis-Corporation.

"M5B90 Aluminium Cutter," (2017). Internet URL: https://www.sandyik.coromant.com/en-us/tools/milling-tools/face-milling-tools/m5b90.

The New FaceMill-Diamond: Process-Reliable Face Miling with a Long Tool Life (2020). Internet URL:https://mapal.com/en-int/a/facemill-diamond.

* cited by examiner

CUTTING TOOL ASSEMBLIES, FACE MILLS, AND RELATED METHODS

CROSS-REFERENCE TO RELATED APPLICATIONS

This application claims the benefit of U.S. Provisional Application No. 63/539,428, filed Sep. 20, 2023, the content of which is incorporated by reference herein in its entirety and for all purposes.

FIELD OF THE DISCLOSURE

This disclosure relates to cutting tool assemblies, and more specifically, to cutting tool assemblies, end mills, and related methods.

BACKGROUND

Coolant is used during machining operations to maintain tool integrity, control temperature, and facilitate chip removal. Traditional cutting tool assemblies often face challenges in efficiently distributing coolant to the cutting area, resulting in inadequate cooling and chip evacuation. Insufficient cooling can lead to reduced tool life, lower machining speeds, and poor surface finish, while ineffective chip evacuation can cause chip clogging, reduced cutting efficiency, and increased tool wear.

SUMMARY

In accordance with a first implementation, a cutting tool assembly includes a tool holder and a face mill. The tool holder includes an elongate body including a flange and a sleeve extending from the flange. The elongate body has a central coolant passage and a plurality of sleeve coolant passages. The sleeve includes a distal end. The sleeve coolant passages are fluidly coupled to the central coolant passage and each have a sleeve opening at the distal end of the sleeve. The face mill includes a cylindrical body including a central bore, a plurality of face mill coolant passages fluidly coupled to the central bore, and a cutting face including a plurality of radially spaced teeth and gaps between the teeth. Each face mill coolant passage includes an opening at a corresponding gap. Coolant is to flow through the central coolant passage and the face mill coolant passages and spray out of the openings at the corresponding gaps.

In accordance with a second implementation, a face mill includes a cylindrical body including a central bore, a plurality of face mill coolant passages fluidly coupled to the central bore, and a cutting face. The cutting face includes a plurality of radially spaced teeth and gaps between the teeth. Each face mill coolant passage includes an opening at a corresponding gap.

In accordance with a third implementation, a method includes rotating a cutting tool assembly including a tool holder and a face mill and flowing coolant into a central coolant passage of an elongate body of the tool holder. The tool holder also includes the elongate body including a flange and a sleeve extending from the flange. The elongate body includes the central coolant passage, a plurality of sleeve coolant passages, and a distal end. The sleeve coolant passages are fluidly coupled to the central coolant passage and each have sleeve openings at the distal end of the sleeve. The method also includes flowing the coolant from the sleeve coolant passages into mill coolant passages of the face mill. The face mill includes a central bore, the face mill coolant passages fluidly coupled to the central bore, and a cutting face includes a plurality of radially spaced teeth and gaps between the teeth. Each face mill coolant passage includes an opening at a corresponding gap. The method also includes spraying the coolant out of nozzles at each opening of the face mill coolant passages.

In accordance with a fourth implementation, an apparatus includes a computer numerical control machine includes a chuck and a cutting tool assembly to be carried by the chuck. The cutting tool assembly includes a cutting tool and a face mill. The tool holder including an elongate body having a flange and a sleeve extending from the flange. The elongate body includes a central coolant passage and a plurality of sleeve coolant passages. The sleeve has a distal end. The sleeve coolant passages are fluidly coupled to the central coolant passage and each have a sleeve opening at the distal end of the sleeve. The face mill includes a cylindrical body including a central bore. The plurality of face mill coolant passages fluidly coupled to the central bore, and a cutting face including a plurality of radially spaced teeth and gaps between the teeth. Each face mill coolant passage has an opening at a corresponding gap. Coolant is to flow through the central coolant passage and the face mill coolant passages and spray out of the openings at the corresponding gaps.

In further accordance with the foregoing first, second, third, and/or fourth implementations, an apparatus and/or method may further comprise or include any one or more of the following:

In accordance with an implementation, the face mill includes a longitudinal axis, and each of the face mill coolant passages includes a first portion and a second portion. The first portions extend radially from the central bore, and the second portions extend substantially parallel relative to the longitudinal axis.

In accordance with another implementation, the cutting tool assembly includes plugs and the face mill includes a circumferential surface and the first portion of the face mill coolant passages each have an opening at the circumferential surface that receive a corresponding plug.

In accordance with another implementation, a surface of the face mill that defines the first portion of the face mill coolant passages includes threads that are threadingly engaged by the plugs.

In accordance with another implementation, the cutting tool assembly includes nozzles. One of the nozzles is coupled at each opening of the face mill coolant passages.

In accordance with another implementation, the nozzles are to dispense coolant toward the teeth at a non-perpendicular angle. In accordance with another implementation, the cutting tool assembly includes a fastener and the sleeve of the tool holder includes internal threads. The face mill includes a central opening. The fastener passes through the central opening of the face mill and threadably engages the internal threads of the sleeve of the tool holder to couple the face mill and the tool holder.

In accordance with another implementation, the cutting tool assembly includes a seal. The face mill includes a seal groove and the seal is disposed within the seal groove and is to sealingly engage the fastener.

In accordance with another implementation, the cutting tool assembly includes a seal. The face mill includes a surface defining a seal groove within the central bore. The seal is disposed within the seal groove and sealingly engages the sleeve of the tool holder.

In accordance with another implementation, the face mill includes a longitudinal axis, and each of the face mill coolant passages include a first portion and a second portion. The first portions extend radially from the central bore, and the second portions extend substantially parallel relative to the longitudinal axis.

In accordance with another implementation, the face mill includes plugs and the face mill includes a circumferential surface and the first portion of the face mill coolant passages each have an opening at the circumferential surface that receive a corresponding plug.

In accordance with another implementation, a surface of the face mill defining the first portion of the face mill coolant passages includes threads that are threadingly engaged by the plugs.

In accordance with another implementation, the face mill includes nozzles. One of the nozzles is coupled at each opening of the face mill coolant passages.

In accordance with another implementation, the face mill includes a seal and the face mill includes a surface defining a seal groove within the central bore that receives the seal.

In accordance with another implementation, the method includes milling a work piece with the face mill.

In accordance with another implementation, spraying the coolant out of nozzles at each opening of the face mill coolant passages includes spraying the coolant onto a cutting surface of the workpiece.

In accordance with another implementation, the method includes enabling a temperature of the workpiece to be at or below a threshold temperature while milling the workpiece.

In accordance with another implementation, the temperature is about 70° Fahrenheit.

In accordance with another implementation, the temperature is about room temperature.

In accordance with another implementation, the apparatus includes a reservoir to be in fluid communication with the cutting tool assembly.

In accordance with another implementation, the apparatus includes coolant. The reservoir contains the coolant.

DETAILED DESCRIPTION

The present disclosure relates to cutting tool assemblies designed to provide efficient coolant flow control and enhancing cooling and chip evacuation during cutting operations. The cutting tool assemblies also enable work pieces milled to be at or below a threshold temperature during milling. This threshold temperature may be around 70° F. (e.g., 21° C.) and/or about room temperature. The threshold temperature may be ambient/room temperature and/or 1° C., 2° C., 3° C., 5° C., 7° C., and/or up to 10° C. above ambient temperature as examples.

The cutting tool assemblies may include a tool holder and a face mill and may be used for milling workpieces in a manner that enables a temperature of the workpiece to remain at or below a threshold level and/or inhibits sparks from being generated when the cutting tool assembly enters and/or leaves the work surface. The cutting tool assembly may enable threshold flatnesses and threshold finishes on a workpiece to be achieved. Surface finishes that are achievable using the disclosed implementations are dependent on grit size, flatness, fixturing and/or tolerance. A flatness of about 0.0002" (about 5 μm) and a roughness average (RA) of about 4 may be achievable using the disclosed implementations. Finer grit sizes may be used to achieve flatter and/or less rough surfaces, for example.

To do so, the cutting tool assemblies enable coolant to be sprayed at the cutting-edge of the face mill and/or onto the worksurface of the workpiece being milled instead of the coolant being sprayed radially from the face mill. The cutting tool assemblies disclosed may be used in high precision face milling applications where surface finish and flatness are desired. The cutting tool assemblies may be used with bimetallic welds or assemblies and can reduce subsequent grind operations. The cutting tool assembles enable coolant to flow and be directed in a manner to enable desired feed rates to be achieved and/or for cutting depths to be increased. The cutting tool assemblies may use a high-pressure coolant system and surface speeds between about 8000 surface feet per minute (SFPM) and about 30,000 SFPM. Higher cutting speeds may be more efficient and/or achieve smoother and/or better surface finishes. The cutting tool assemblies may be used at speeds up to around 32,000 SFPM, for example depending on diameter. Other speeds may also be used. Desired flatness and finish may be achieved through an engineered machining path and process.

Figure 1:
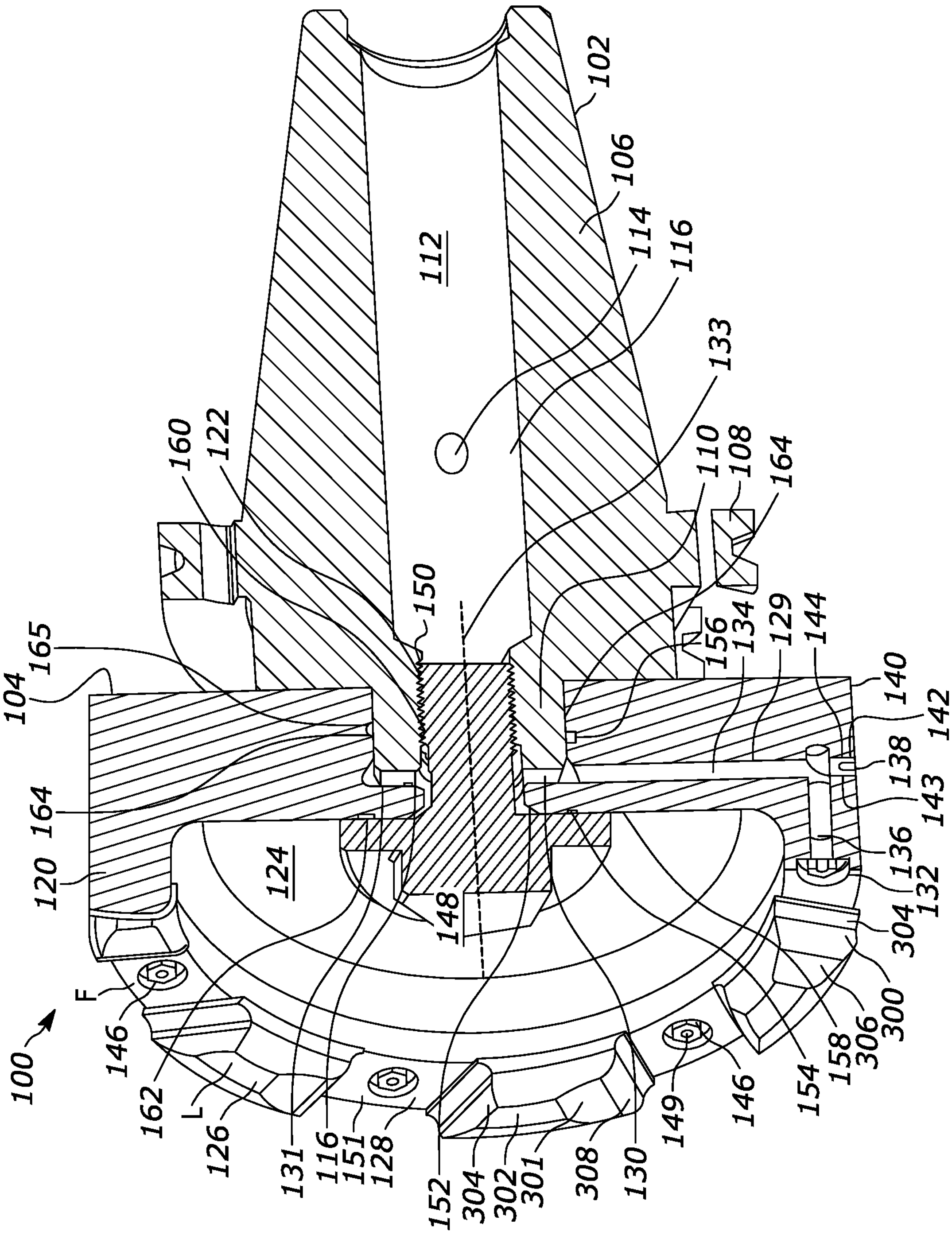
FIG. 1 is an isometric cross-sectional view of a cutting tool assembly in accordance with the teachings of this disclosure.

FIG. 1 is an isometric cross-sectional view of a cutting tool assembly 100 in accordance with the teachings of this disclosure. The cutting tool assembly 100 includes a tool holder 102 and a face mill 104. The face mill 104 may have a diameter of about 5 inches in some implementations. The face mill 104 may be referred to as a diamond plating face mill, for example including diamond abrasive particles in a composite matrix as the milling or abrasive material (e.g., forming teeth 126 as described below). The face mill 104 may include Cubic Boron Nitride (CBN), natural diamond, and/or synthetic diamond. Other types of abrasive particles may be used, however. The tool holder 102 includes an elongate body 106 that includes a flange 108 and a sleeve 110 extending from the flange 108. The elongate body 106 includes a central coolant passage 112 and a plurality of sleeve coolant passages 114 and the sleeve 110 has a distal end 116. The sleeve coolant passages 114 are fluidly coupled to the central coolant passage 112 and each have sleeve openings 118 (see, FIG. 2) at the distal end 116 of the sleeve 110. The central coolant passage 112 and the sleeve coolant passages 114 enable coolant to flow through the tool holder 102. Coolant can be delivered from an external (pressurized) reservoir (not shown), for example, through one or more sleeve coolant passages 114 at a sidewall of the central coolant passage 112, into the central coolant passage 112, and then through one or more other sleeve coolant passages 114 at the distal end 116 of the sleeve 110.

The face mill 104 includes a cylindrical body 120 with a central bore 122 and a cutting face 124 having a plurality of radially spaced teeth 126, for example, being positioned at outward radial locations spaced away from the central bore 122, such as around the outer circumference of the cylindrical body 120. The face mill 104 is shown including 7 teeth (see, FIG. 2) but any other number of teeth may be included and/or a diameter of the face mill 104 may change (increase or decrease). The face mill 104 may include 9 teeth, 11 teeth, 13 teeth, 15 teeth for example. The shape, size, and number of teeth may be selected based on the tool size and/or the intended application.

Gaps 128 are positioned between the teeth 126, and the gaps 128 can similarly be positioned at outward radial locations around the outer circumference of the cylindrical body 120. The face mill 104 also includes multiple face mill coolant passages 129. The face mill coolant passages 129 are fluidly coupled to the central bore 122 of the face mill 104, allowing coolant to flow from the central bore 122 to the cutting face 124. A gap 130 is provided between the distal end 116 of the sleeve 110 and an opposing surface 131. The gap 130 enables coolant to flow out of the sleeve coolant passages 114 and flow into the face mill coolant passages 129. Each of the face mill coolant passages 129 has an opening 132 at a corresponding gap 128. Coolant flows through the central coolant passage 112 and the face mill coolant passages 129 in operation and sprays out of the openings 132 at the corresponding gaps 128. The face mill 104 has a longitudinal axis 133 and each of the face mill coolant passages 129 has a first portion 134 and a second portion 136. The first portions 134 extend radially from the central bore 122 and the second portions 136 extend substantially parallel relative to the longitudinal axis 133.

The cutting tool assembly 100 also includes plugs 138 and the face mill 104 has a circumferential surface 140 at the outer circumference or radius of the cylindrical body 120. The first portion 134 of the face mill coolant passages 129 each have an opening 142 at the circumferential surface 140 that receive a corresponding plug 138. The first portion 134 of the face mill coolant passages 129 may facilitate ease of manufacturing in that a tool such as a drill may drill from the circumferential surface 140 to the central bore 122 to form the first portion 134 of the face mill coolant passages 129. Subsequent insertion of the corresponding plug 138 at the circumferential surface 140 deters radial loss of coolant during use and completes the flow path from the first portion 134 to the second portion 136 of the coolant passage 129.

A surface 143 of the face mill 104 that defines the first portions 134 of the face mill coolant passages 129 may include threads 144 that are threadingly engaged by the plugs 138. The plugs 138 may be coupled within the first portions 134 of the face mill coolant passages 129 in different ways, however. The plugs 138 may be coupled within the face mill coolant passages 129 using adhesive and/or using a press-fit connection, for example.

The cutting tool assembly 100 also includes nozzles 146. The nozzles 146 are coupled at each opening 142 of the face mill coolant passages 129. The nozzles 146 may be used to spray coolant onto a work surface of a workpiece being milled and/or onto the teeth 126 of the face mill 104. The nozzles 146 can have a geometry selected to orient or otherwise distribute coolant exiting therefrom in a desired pattern to in turn cover or coat a desired portion of the work surface and/or the teeth 126. The work surface may be referred to as a cutting surface. The nozzles 146 may deliver coolant in a targeted manner by directing the coolant flow onto cutting edges of the teeth 126 and/or onto a machining area on the work piece, resulting in efficient cooling, reduced tool wear, and/or effective chip evacuation. The nozzles 146 may have different thru hole or opening sizes or diameters to accommodate different high pressure coolant system pumps. The placement of the nozzles 146 between the teeth 126 may enable the coolant to be sprayed in a way that enables a temperature of the workpiece being milled by the cutting tool assembly 100 to be at or below a threshold temperature, for example. The temperature may be about 70 Fahrenheit and/or about room temperature. The temperature of may be higher or lower than 70 Fahrenheit, however.

A surface of the face mill 104 that defines the second portions 136 of the face mill coolant passages 129 may include threads and the nozzles 146 may threadably engage the threads. The nozzles 146 may be coupled to the face mill 104 in different ways, however.

The teeth 126 include a leading portion 300, a tapered surface 301, a central surface 302, and a trailing portion 304 in the implementation shown. The central surface 302 may be referred to as a land. The leading portion 300 has a first curved surface 306 that extends from the corresponding gap 128 and a second curved surface 308 that extends toward the tapered surface 301. The first curved surface 306 may have a radius or radius of curvature of about 0.125 inches (e.g., about 0.2, 0.25, 0.3, 0.35, or 0.4 cm) and the second curved surface 308 may have a radius or radius of curvature of about 0.125 inches (e.g., about 0.2, 0.25, 0.3, 0.35, or 0.4 cm). The radius or radius of curvature of the first curved surface 306 may have a tolerance of between about +/−0.020 inches (e.g., about +/−0.01, 0.02, 0.03, 0.04, 0.05, or 0.06 cm) and the second curved surface 308 may have a tolerance of between about +/−0.010 inches (e.g., about +/−0.005, 0.01, 0.015, 0.02, 0.025, or 0.03 cm). The tapered surface 301 may have an angle of about 5° (e.g., about 2, 3, 4, 5, 6, 7, or 8°, such as within about +/−0.01, 0.02, 0.05, 0.1, 0.2, or 0.5° of the foregoing) toward the central surface 302. The curved surfaces 306 and/or 308 may have any other radius and/or the tapered surface 301 may have any other angle, however.

Figure 2:
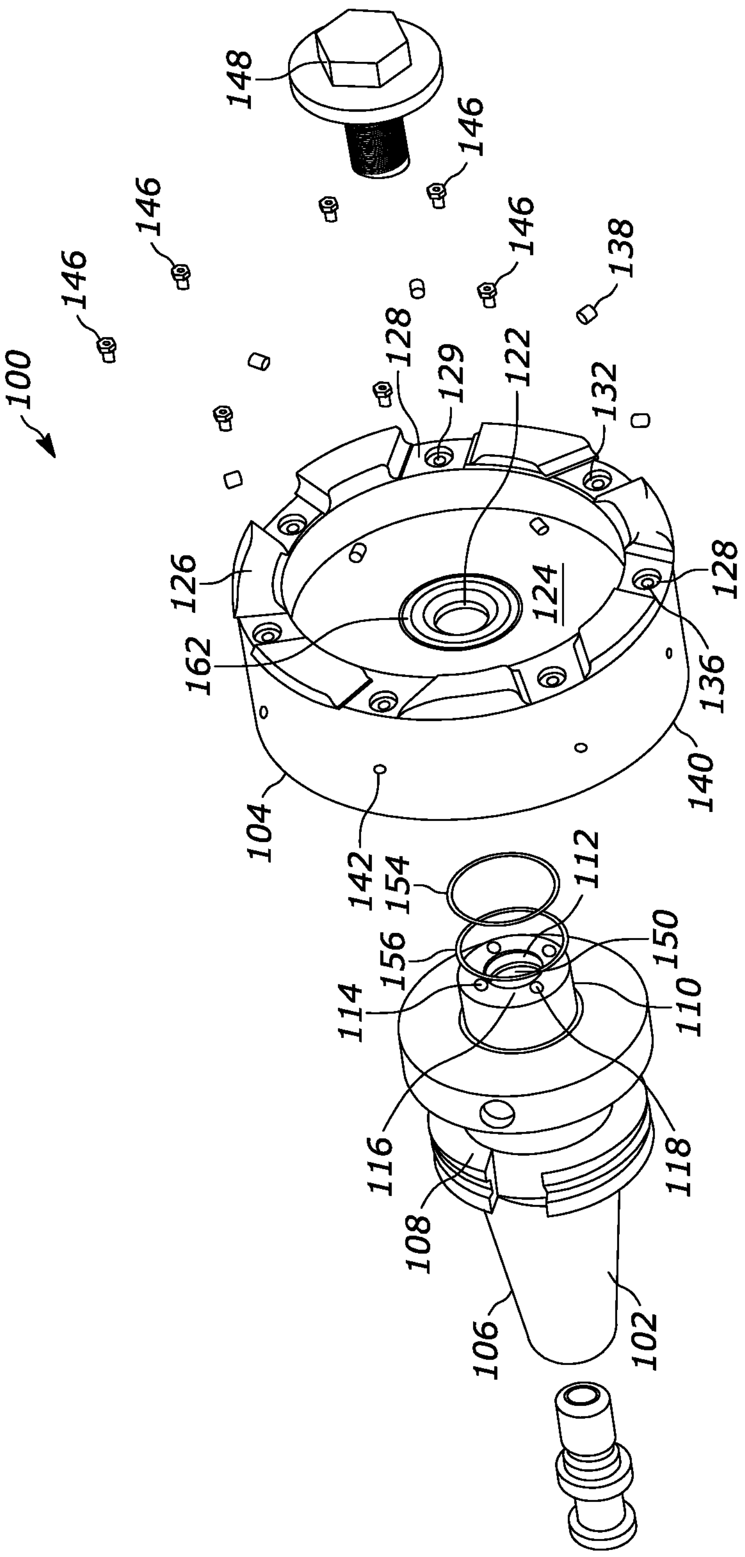
FIG. 2 is an expanded isometric view of the cutting tool assembly of FIG. 1.

The size, shape, and geometry of the teeth 126 and the gaps 128 may be selected to improve performance of the tool 100 during operation, for example improving and/or controlling coolant flow, coolant coverage, temperature of the tool and/or workpiece, swarf removal from the area being worked, etc. In addition and/or as an alternative to the radii and angles discussed above for the teeth 126, the tool 100 geometry may be selected such that a ratio (F:L) of flute area (F) to land area (L) may be in a range of about 1:1 to 10:1, 2:1 to 5:1, or 3:1 to 4:1, such as at least 1:1, 1.5:1, 2:1, 2.5:1, 2.8:1, 3:1, 3.2:1, 3.5:1, 3.8:1, 4:1, 5:1, or 6:1 and/or up to 3:1, 3.2:1, 3.5:1, 3.8:1, 4:1, 4.2:1, 4.5:1, 4.8:1, 5:1, 5.5:1, 6:1, 7:1, 8:1, 9:1, or 10:1 (i.e., generally representing a flute area that is at least as large or larger than a land area). As illustrated in FIGS. 1-2, the flute area (F) generally corresponds to an outer circumferential surface or area of the face mill 104 cylindrical body 120 that is between successive teeth 126, for example as represented by the gap 128 or surface 151 defining the gap 128. The land area (F) generally corresponds to a (substantially flat) portion of a given tooth 126 that contacts a workpiece during operation of the tool 100, for example as represented by the central surface 302 of a given tooth 126. The foregoing ranges and values for the flute:land (F:L) ratios can apply to either or both of (i) individual pairwise combinations of adjacent flute (F) and land (L) areas, and (ii) the collective combination of all flute areas (F) and all land areas (L) in a tool 100 (e.g., the sum of all seven flute areas (F) relative to the sum of all seven land areas (L) in the tool 100 illustrated in FIG. 2 with seven teeth 126 and seven gaps 128).

The nozzles 146 spray coolant in operation and the leading portion 300 may be configured to direct the coolant toward the tapered surface 301 and between the face mill 104 and the work piece, for example. The nozzles 146 include a flow passage 147 having an opening 149 that dispenses the coolant.

The face mill 104 has a surface 151 that defines the gap 128, and the flow passage 147 and/or the opening 149 positioned in the gap 128 may be configured to direct the coolant substantially perpendicularly relative to the surface 151. The flow passage 147 and/or the opening 149 may alternatively be configured to direct the coolant at a non-perpendicular angle relative to the surface 151. For example, the flow passage 147 and/or the opening 149 may direct the coolant toward the leading portion 300 in some examples (see, FIG. 6, for example).

The cutting tool assembly 100 also includes a fastener 148, the sleeve 110 of the tool holder 102 has internal threads 150, and the face mill 104 includes a central opening 152. The fastener 148 is shown passing through the central opening 152 of the face mill 104 and threadably engaging the internal threads 150 of the sleeve 110 of the tool holder 102 to couple the face mill 104 and the tool holder 102.

The cutting tool assembly 100 also includes a pair of seals 154, 156 in the implementation shown. The seals 154, 156 may enable coolant flow out of the sleeve coolant passages 114 to be directed into the face mill coolant passages 129. The seals 154, 156 may inhibit coolant from leaking out from between an interface 158 between the fastener 148 and the face mill 104 and from leaking out between an interface 160 between the tool holder 102 and the face mill 104, for example.

The face mill 104 includes a seal groove 162 and the seal 154 is disposed within the seal groove 162. The seal 154 sealingly engages the fastener 148. The seal 154 inhibits coolant from flowing between the interface 158 of the face mill 104 and the fastener 148. The face mill 104 also includes a surface 164 defining a seal groove 165 within the central bore 122. The seal 156 is disposed within the seal groove 165 and sealingly engages the sleeve 110 of the tool holder 102. The seal 156 inhibits coolant from flowing between the interface 160 of the tool holder 102 and the face mill 104.

The cutting tool assembly 100 is rotated in operation and coolant is introduced into the central coolant passage 112 of the tool holder 102. The coolant flows from the central coolant passage 112 to the sleeve coolant passages 114 and out of the face mill coolant passages 129, at the cutting face 124 of the face mill 104. The nozzles 146 spray the coolant onto the work surface of the work piece being milled, the cutting face 124, and/or the teeth 126 effectively cooling cutting edges of the teeth 126 and/or the work surface of the workpiece. The nozzles 146 may spray the coolant at a relatively high pressure at the cut and/or at a core of the cut to the workpiece surface. The pressure may be between about 500 Pounds Per Square Inch (psi) to about 3000 psi (e.g., at least about 30, 40, 60, 80, 100, 120, or 150 bar and/or up to about 100, 150, 200, 250, or 300 bar).

FIG. 2 is an expanded isometric view of the cutting tool assembly 100 of FIG. 1. The cutting tool assembly includes the tool holder 102, the face mill 104, and the fastener 148.

Figure 3:
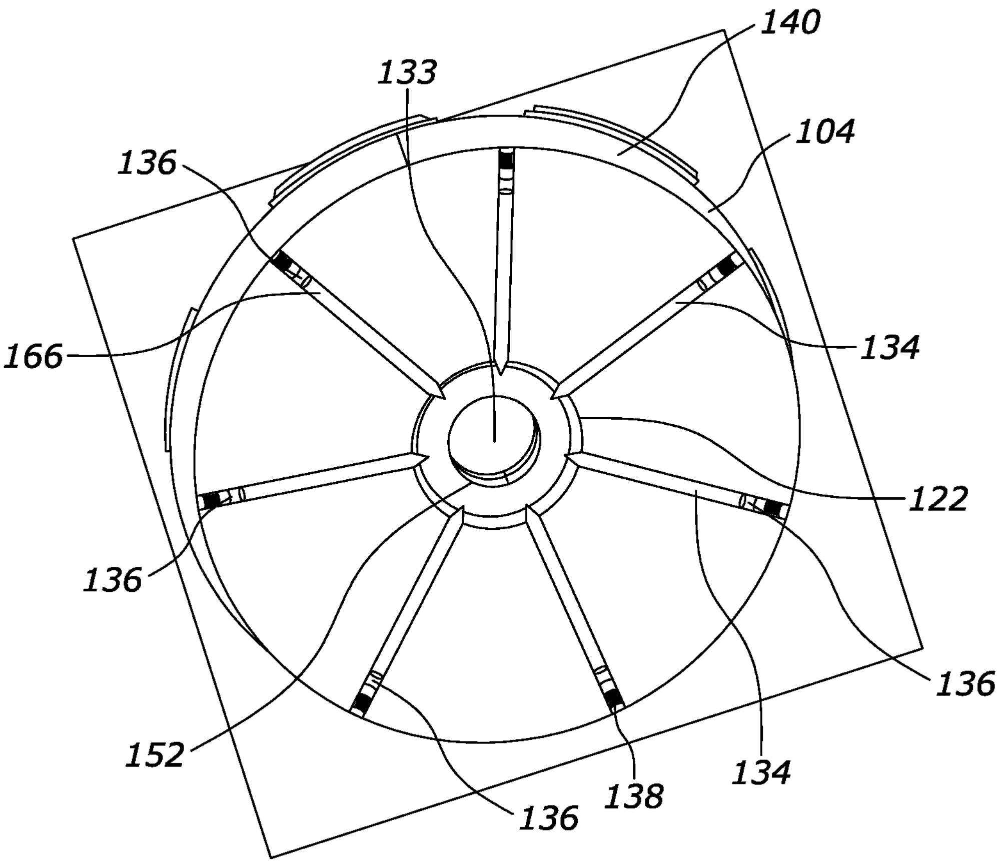
FIG. 3 is a cross-sectional isometric view of the face mill of the cutting tool assembly of FIG. 1.

FIG. 3 is a cross-sectional isometric view of the face mill 104 of the cutting tool assembly 100 of FIG. 1. The first portions 134 of the face mill coolant passages 129 are shown radially extending from the central bore 122 to the circumferential surface 140. The plugs 138 are shown closing the opening 142 at the circumferential surface 140 of the face mill 104 to enable the coolant to flow into the second portion 136 of the face mill coolant passage 129. The face mill 104 is shown including seven face mill coolant passages 129. The face mill 104 may include more or less face mill coolant passages, however. The coolant passages 129 suitably can be spaced at approximately equal angular positions relative to each other (e.g., about 51.4° for the seven illustrated coolant passages 129). The second portions 136 of the face mill coolant passages 129 are shown substantially being positioned parallel to the longitudinal axis 133 of the face mill 104. The first portions 134 of the face mill coolant passages 129 have a distal end 166 and the second portions 136 are coupled to the first portions 134 at the corresponding distal ends 166.

Figure 4:
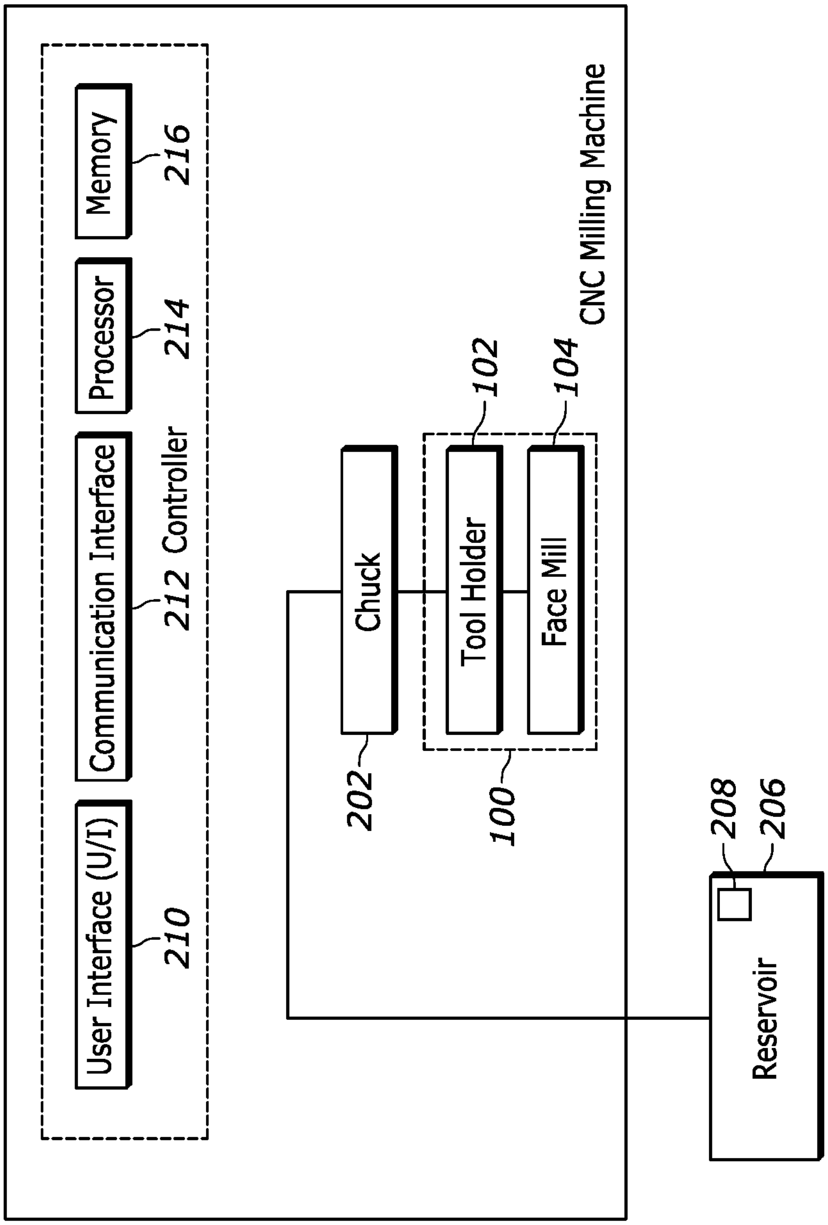
FIG. 4 is a schematic implementation of a computer numerical control (CNC) machine including a chuck that carries the cutting tool assembly and includes a controller.

FIG. 4 is a schematic implementation of a computer numerical control (CNC) machine 200 including a chuck 202 that carries the cutting tool assembly 100 and includes a controller 204. The controller 204 is electrically and/or communicatively coupled to the chuck 202 and causes the chuck 202 to perform various functions as disclosed herein. A reservoir 206 is shown in fluidic communication with the cutting tool assembly 100. The reservoir 206 may contain coolant 208.

The controller 204 includes a user interface 210, a communication interface 212, one or more processors 212, and a memory 216 storing instructions executable by the one or more processors 212 to perform various functions including the disclosed implementations. The user interface 210, the communication interface 212, and the memory 216 are electrically and/or communicatively coupled to the one or more processors 212.

In an implementation, the user interface 210 receives input from a user and provides information to the user associated with the operation of the CNC machine 200 and/or a milling process taking place. The user interface 210 may include a touch screen, a display, a keyboard, a speaker (s), a mouse, a track ball, and/or a voice recognition system. The touch screen and/or the display may display a graphical user interface (GUI).

In an implementation, the communication interface 212 enables communication between the CNC machine 200 and a remote system(s) (e.g., computers) via a network(s). The network(s) may include an intranet, a local-area network (LAN), a wide-area network (WAN), the intranet, etc. Some of the communications provided to the remote system may be associated with milling information, workpiece information, and/or part information generated or otherwise obtained by the CNC machine 200. Some of the communications provided to the CNC machine 200 may be associated with a milling operation(s), coolant flow, and/or coolant pressure to be executed by the CNC machine 200.

The one or more processors 212 and/or the CNC machine 200 may include one or more of a processor-based system(s) or a microprocessor-based system(s). In some implementations, the one or more processors 212 and/or the CNC machine 200 includes a reduced-instruction set computer(s) (RISC), an application specific integrated circuit(s) (ASICs), a field programable gate array(s) (FPGAs), a field programable logic device(s) (FPLD(s)), a logic circuit(s), and/or another logic-based device executing various functions including the ones described herein.

The memory 216 can include one or more of a hard disk drive, a flash memory, a read-only memory (ROM), erasable programable read-only memory (EPROM), electrically erasable programable read-only memory (EEPROM), a random-access memory (RAM), non-volatile RAM (NVRAM) memory, a compact disk (CD), a digital versatile disk (DVD), a cache, and/or any other storage device or storage disk in which information is stored for any duration (e.g., permanently, temporarily, for extended periods of time, for buffering, for caching).

Figure 5:
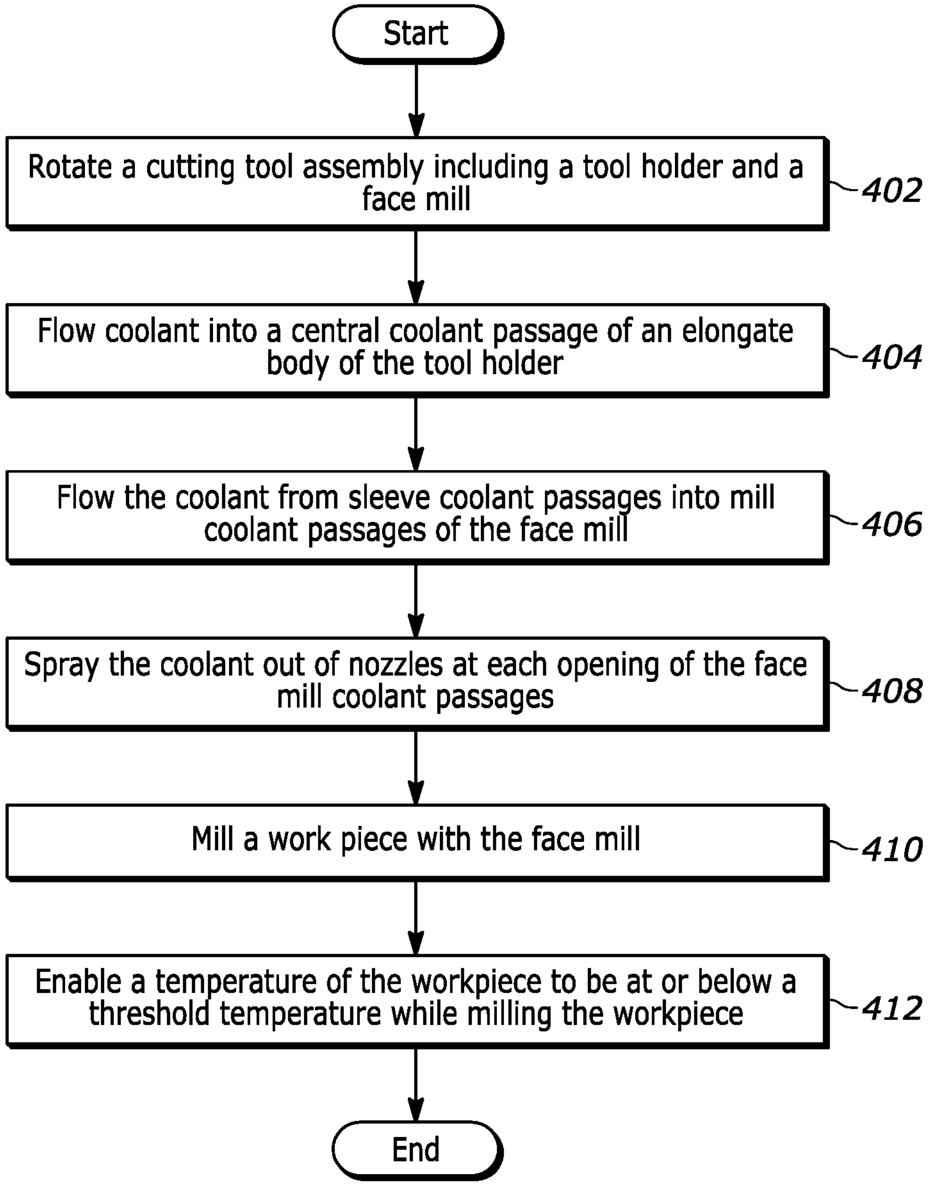
FIG. 5 illustrates a flowchart for a method of using the cutting tool assembly of FIGS. 1-3.

FIG. 5 illustrates a flowchart for a method of using the cutting tool assembly 100 of FIGS. 1-3. The order of execution of the blocks may be changed, and/or some of the blocks described may be changed, eliminated, combined and/or subdivided into multiple blocks.

The process of FIG. 5 begins with the cutting tool assembly 100 that includes the tool holder 102 and the face mill 104 being rotated (Block 402). Coolant is flowed into a central coolant passage 112 of an elongate body 106 of the tool holder 102 (Block 404). The tool holder 102 includes the elongate body 106 having the flange 108 and the sleeve 110 extending from the flange 108. The elongate body 106 includes the central coolant passage 112, the plurality of sleeve coolant passages 114, and the distal end 116. The sleeve coolant passages 114 are fluidly coupled to the central coolant passage 112 and each have sleeve openings 118 at the distal end 116 of the sleeve 110.

The coolant is flowed from the sleeve coolant passages 114 into mill coolant passages of the face mill 104 (Block 406). The face mill 104 includes the central bore 122, the face mill coolant passages 129 fluidly coupled to the central bore 122, and the cutting face 124. The cutting face 124 includes the radially spaced teeth 126 and the gaps 128 between the teeth 126, where each face mill coolant passage 129 has the opening 132 at a corresponding gap 128.

The coolant is sprayed out of the nozzles 146 at each opening of the face mill coolant passages 129 (Block 408) and a work piece is milled with the face mill 104 (Block 410). The work piece may be made of steel, cast irons, super alloys, Stainless steels, aluminum, hard welds any alloy, white metals, red metals, ceramics (e.g., silicon carbide (SiC), Sapphire, and other hard ceramics), glass, and/or composite materials as examples.

Spraying the coolant out of the nozzles 146 at each opening 132 of the face mill coolant passages 129 includes spraying the coolant onto a cutting surface of the workpiece. The nozzles 146 may spray the coolant outwardly from the cutting face 124 and/or along the longitudinal axis 133. The nozzles 146 may thus not spray the coolant radially and/or from the circumferential surface 140 of the face mill 104. A temperature of the workpiece is enabled to be to be at or below a threshold temperature while milling the workpiece (Block 412). The temperature may be about 70 Fahrenheit and/or the temperature may be about room temperature.

Figure 6:
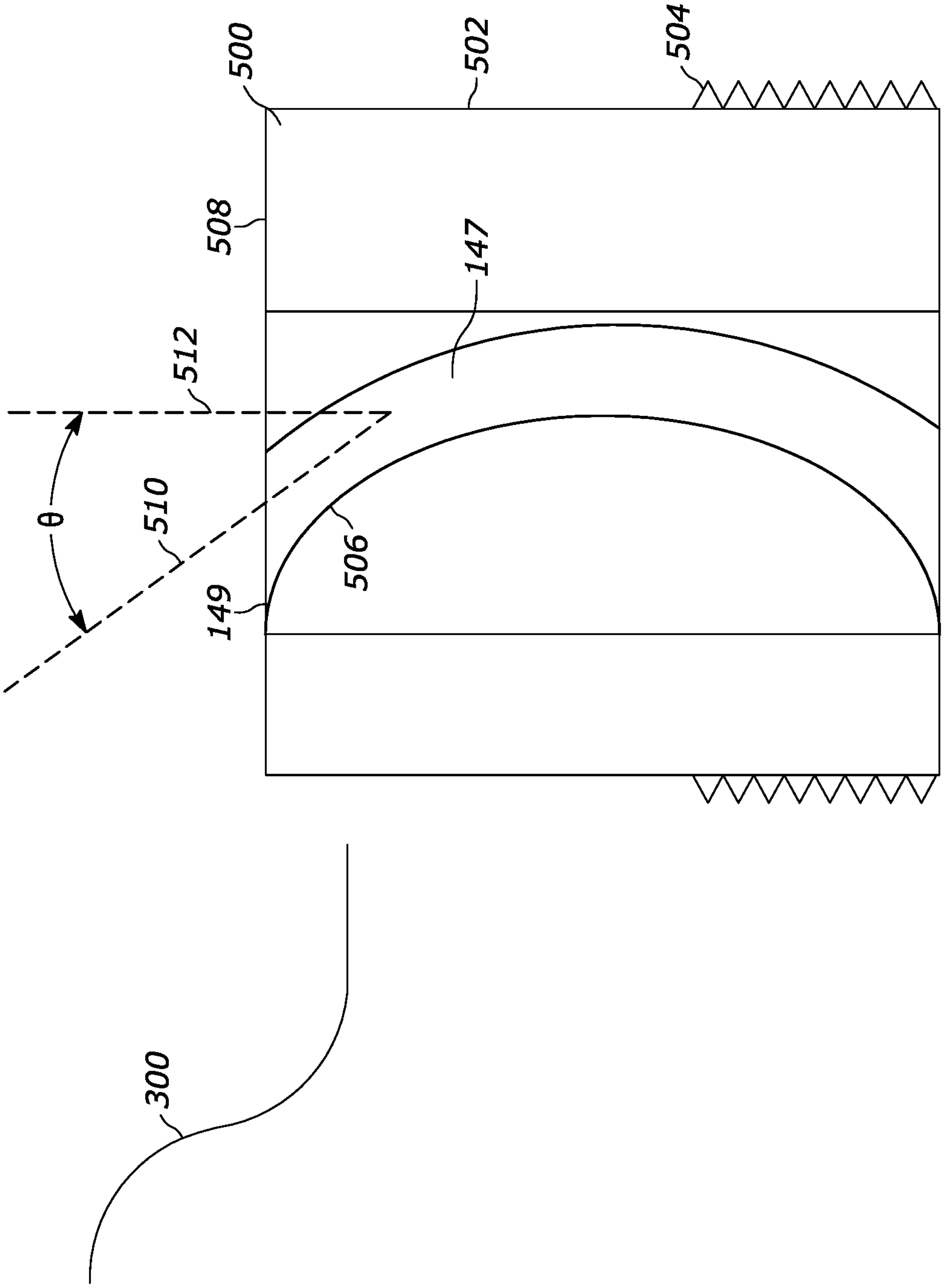
FIG. 6 is cross-sectional view of a nozzle that can be used to implement the nozzle of the cutting tool assembly of FIG. 1.

FIG. 6 is cross-sectional view of a nozzle 500 that can be used to implement the nozzle 146 of the cutting tool assembly 100 of FIG. 1. The nozzle 500 has a body 502 that includes external threads 504 and defines the flow passage 147 having the opening 149. The flow passage 147 has a portion 506 and the nozzle 500 has a top surface 508. The portion 506 has a longitudinal axis 510 that is non-perpendicular to the top surface 508. The portion 506 being non-perpendicular relative to the top surface 508 enables coolant that is dispensed by the nozzle to be directed toward the leading portion 300 of the teeth 126. The nozzle 500 may thus dispense coolant toward the teeth 126 at a non-perpendicular angle. The threads 504 may position the longitudinal axis 510 (e.g., defined by the flow passage 147 at exit and generally corresponding to a direction of flow of (coolant) fluid exiting the flow passage) toward the leading edge 300 of the teeth 126. While the flow passage 147 is shown being arched, the flow passage 147 may have any other shape to direct the coolant toward the leading portion 300 of the teeth 126. The flow passage 147 may be a straight passage that that is angled toward the teeth 126, for example. As an example, an angle θ between a perpendicular or normal direction 512 defined by the top surface 508 and the longitudinal axis 510 may be in a range of about 5° to 80° (e.g., at least 5, 10, 15, 20, 25, 30, 40, or 50° and/or up to 20, 30, 40, 50, 60, 70, or 80°).

Figure 7:
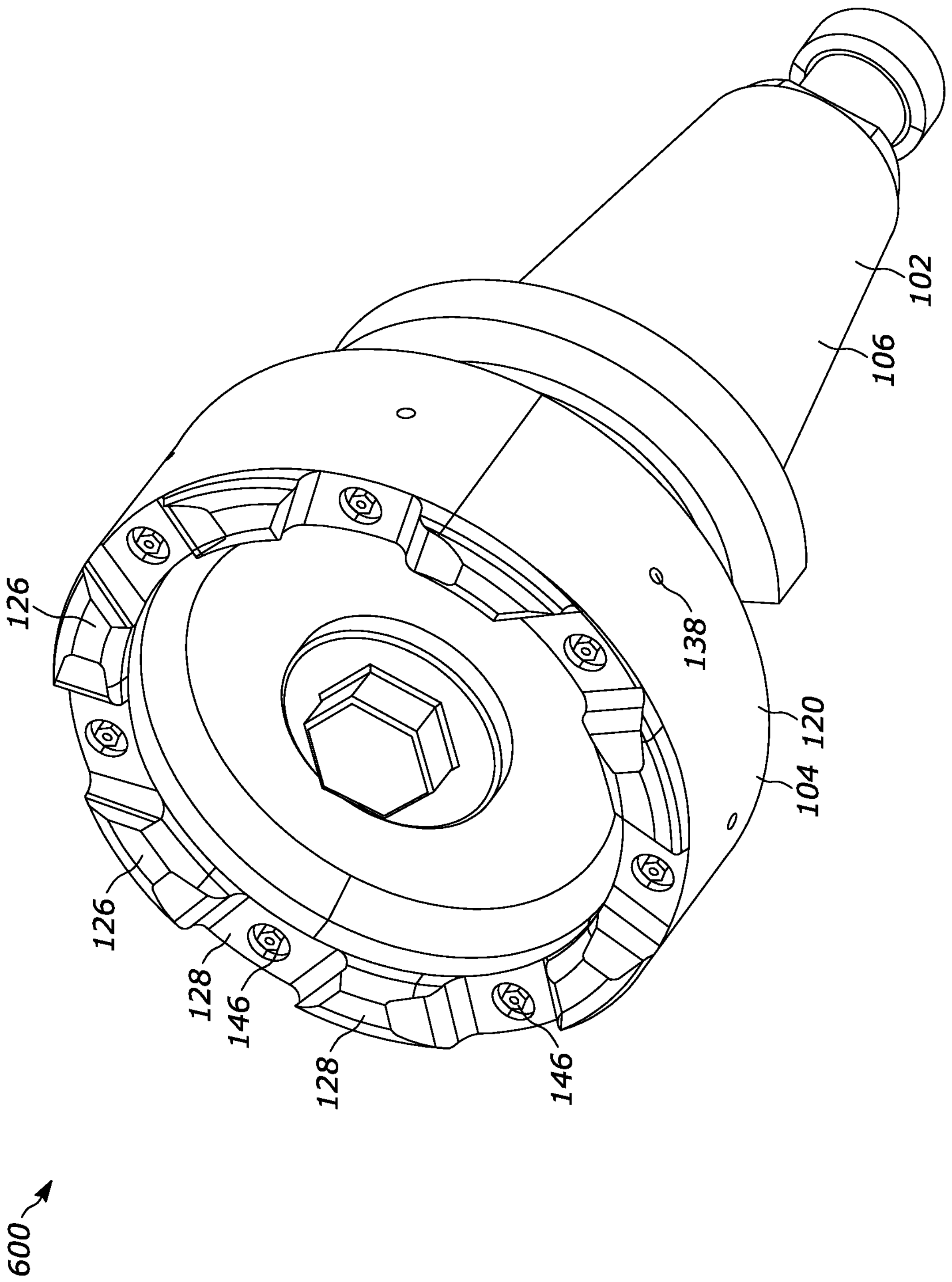
FIG. 7 is an isometric view of another implementation of a cutting tool assembly.

FIG. 7 is an isometric view of another implementation of a cutting tool assembly 600. The cutting tool assembly 600 of FIG. 7 is similar to the cutting tool assembly 100 of FIG. 1. The face mill 104 of the cutting tool assembly 600 of FIG. 7 may have about a 5-inch diameter. The face mill 104 of the cutting tool assembly 600 may have a different diameter, however. The face mill 104 of the cutting tool assembly 600 may have a 4-inch diameter, for example.

Figure 8:
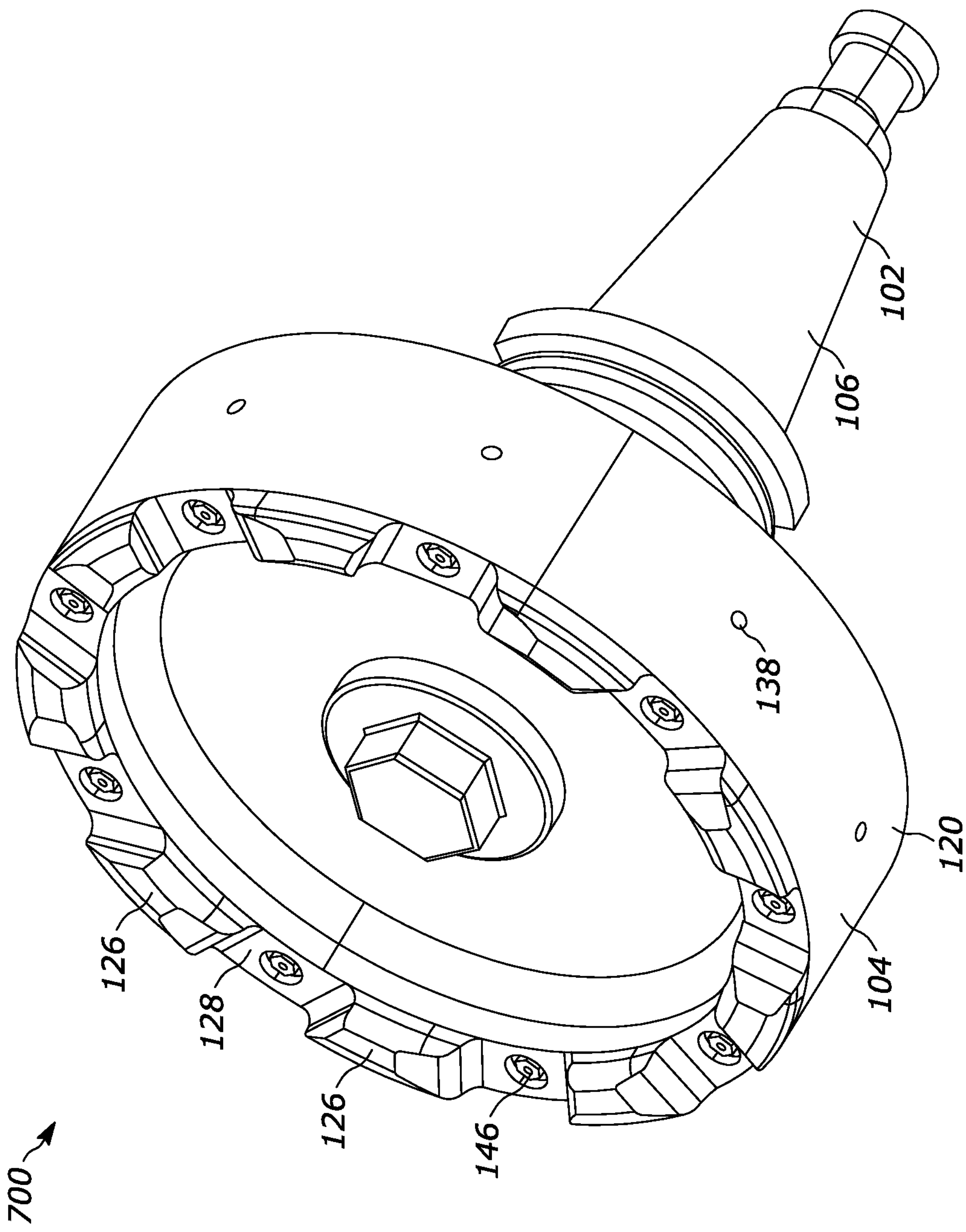
FIG. 8 is an isometric view of another implementation of a cutting tool assembly.

FIG. 8 is an isometric view of another implementation of a cutting tool assembly 700. The cutting tool assembly 700 of FIG. 8 is similar to the cutting tool assembly 100 of FIG. 1. The face mill 104 of the cutting tool assembly 700 of FIG. 8 has nine teeth 126 and may have about a 6-inch diameter. The cutting tool assembly 700 may be a different size and/or have a different number of teeth, however.

Figure 9:
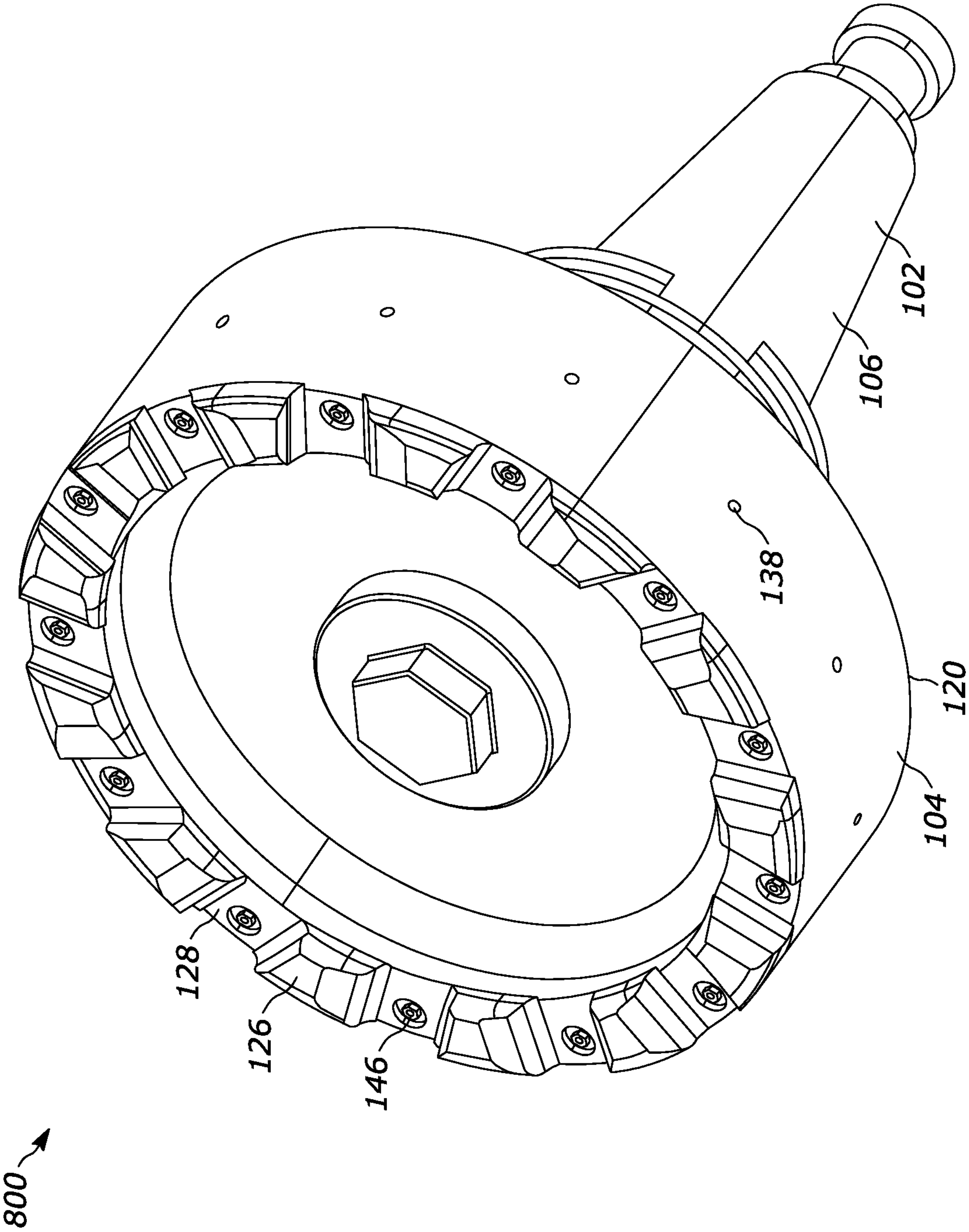
FIG. 9 is an isometric view of another implementation of a cutting tool assembly.

FIG. 9 is an isometric view of another implementation of a cutting tool assembly 800. The cutting tool assembly 800 of FIG. 9 is similar to the cutting tool assembly 100 of FIG. 1. The face mill 104 of the cutting tool assembly 800 of FIG. 9 has thirteen teeth 126 and may have about an 8-inch diameter. The cutting tool assembly 800 may be a different size and/or have a different number of teeth, however.

Figure 10:
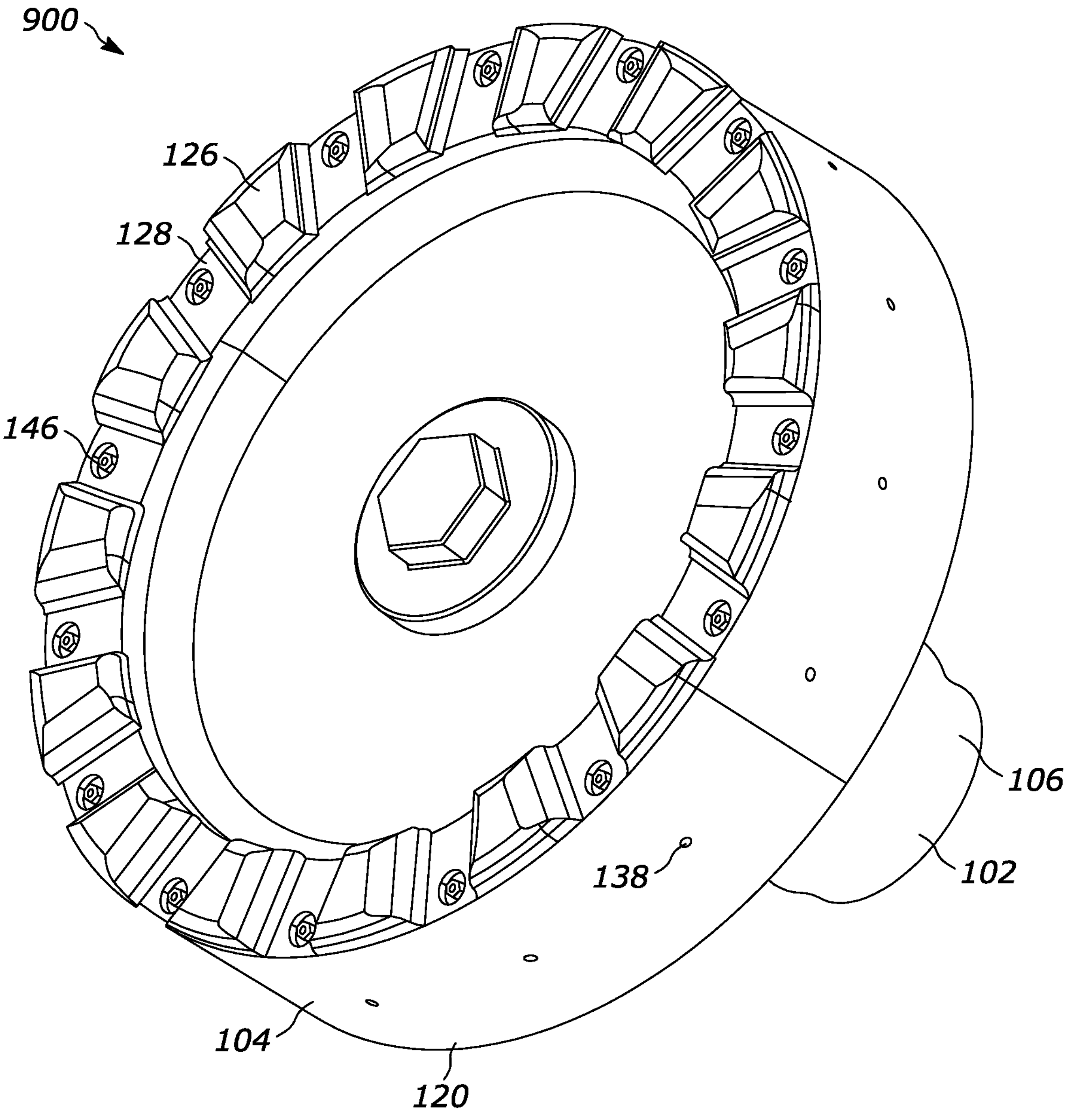
FIG. 10 is an isometric view of another implementation of a cutting tool assembly.

FIG. 10 is an isometric view of another implementation of a cutting tool assembly 900. The cutting tool assembly 900 of FIG. 10 is similar to the cutting tool assembly 100 of FIG. 1. The face mill 104 of the cutting tool assembly 900 of FIG. 10 has fifteen teeth 126 and may have about a 10-inch diameter. The cutting tool assembly 900 may be a different size and/or have a different number of teeth, however.

Figure 11:
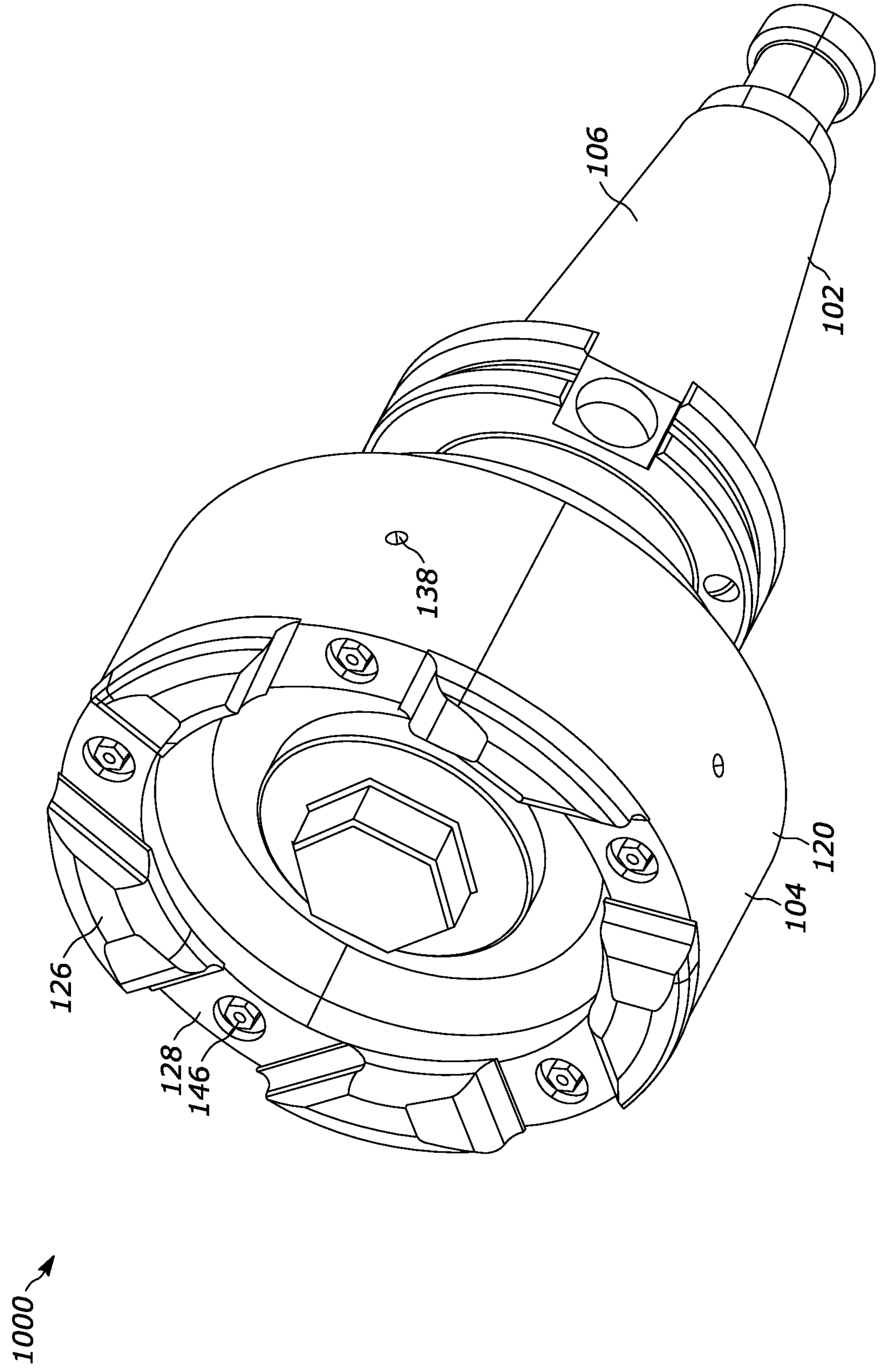
FIG. 11 is an isometric view of another implementation of a cutting tool assembly.

FIG. 11 is an isometric view of another implementation of a cutting tool assembly 1000. The cutting tool assembly 1000 of FIG. 11 is similar to the cutting tool assembly 100 of FIG. 1. The face mill 104 of the cutting tool assembly 1000 of FIG. 11 has five teeth 126 and may have about a 4-inch diameter. The cutting tool assembly 1000 may be a different size and/or have a different number of teeth, however.

Further, while several examples have been disclosed herein, any features from any examples may be combined with or replaced by other features from other examples. Moreover, while several examples have been disclosed herein, changes may be made to the disclosed examples without departing from the scope of the claims.

What is claimed is:

1. A cutting tool assembly, comprising:

a tool holder comprising an elongate body comprising a flange and a sleeve extending from the flange, the elongate body comprises a central coolant passage and a plurality of sleeve coolant passages, the sleeve comprising a distal end, the sleeve coolant passages are fluidly coupled to the central coolant passage and each have a sleeve opening at the distal end of the sleeve;

a face mill comprising a cylindrical body comprising a central bore, a plurality of face mill coolant passages fluidly coupled to the central bore, and a cutting face comprising a plurality of circumferentially spaced teeth and gaps between the teeth, wherein each face mill coolant passage comprises an opening at a corresponding gap; and plugs, wherein coolant is to flow through the central coolant passage and the face mill coolant passages and spray out of the openings at the corresponding gaps, wherein the face mill comprises a longitudinal axis, and wherein each of the face mill coolant passages comprise a first portion and a second portion, the first portions extend radially from the central bore, and the second portions extend substantially parallel relative to the longitudinal axis, wherein the face mill comprises a circumferential surface and the first portion of the face mill coolant passages each have an opening at the circumferential surface that receive a corresponding plug.

2. The cutting tool assembly of claim 1, wherein a surface of the face mill that defines the first portion of the face mill coolant passages comprises threads that are threadingly engaged by the plugs.

3. The cutting tool assembly of claim 1, further comprising nozzles, one of the nozzles coupled at each opening of the face mill coolant passages.

4. The cutting tool assembly of claim 1, further comprising a seal, wherein the face mill comprises a surface defining a seal groove within the central bore, the seal disposed within the seal groove and sealingly engaging the sleeve of the tool holder.

5. The cutting tool assembly of claim 1, further comprising a fastener, wherein the sleeve of the tool holder comprises internal threads and wherein the face mill comprises a central opening, the fastener passing through the central opening of the face mill and threadably engages the internal threads of the sleeve of the tool holder to couple the face mill and the tool holder.

6. The cutting tool assembly of claim 5, further comprising a seal, wherein the face mill comprises a seal groove and the seal is disposed within the seal groove and is to sealingly engage the fastener.

7. A face mill, comprising:

a cylindrical body comprising a central bore, a plurality of face mill coolant passages fluidly coupled to the central bore, and a cutting face, the cutting face, comprising:

a plurality of circumferentially spaced teeth;

gaps between the teeth, wherein each face mill coolant passage comprises an opening at a corresponding gap; and plugs, wherein the face mill comprises a longitudinal axis, and wherein each of the face mill coolant passages comprise a first portion and a second portion, the first portions extend radially from the central bore, and the second portions extend substantially parallel relative to the longitudinal axis, wherein the face mill comprises a circumferential surface and the first portion of the face mill coolant passages each have an opening at the circumferential surface that receive a corresponding plug.

8. The face mill of claim 7, wherein a surface of the face mill defining the first portion of the face mill coolant passages comprises threads that are threadingly engaged by the plugs.

9. The face mill of claim 7, further comprising a seal, wherein the face mill comprises a surface defining a seal groove within the central bore that receives the seal.

10. The face mill of claim 7, further comprising nozzles, one of the nozzles coupled at each opening of the face mill coolant passages.

11. The face mill of claim 10, wherein the nozzles are to dispense coolant toward the teeth at a non-perpendicular angle.

12. An apparatus, comprising:

a computer numerical control machine comprising a chuck; and a cutting tool assembly to be carried by the chuck, wherein the cutting tool assembly, comprises:

a tool holder comprising an elongate body comprising a flange and a sleeve extending from the flange, the elongate body comprises a central coolant passage and a plurality of sleeve coolant passages, the sleeve comprising a distal end, the sleeve coolant passages are fluidly coupled to the central coolant passage and each have a sleeve opening at the distal end of the sleeve;

a face mill comprising a cylindrical body comprising a central bore, a plurality of face mill coolant passages fluidly coupled to the central bore, and a cutting face comprising a plurality of circumferentially spaced teeth and gaps between the teeth, wherein each face mill coolant passage comprises an opening at a corresponding gap; and plugs, wherein the face mill comprises a longitudinal axis, and wherein each of the face mill coolant passages comprise a first portion and a second portion, the first portions extend radially from the central bore, and the second portions extend substantially parallel relative to the longitudinal axis, wherein the face mill comprises a circumferential surface and the first portion of the face mill coolant passages each have an opening at the circumferential surface that receive a corresponding plug, wherein coolant is to flow through the central coolant passage and the face mill coolant passages and spray out of the openings at the corresponding gaps.

13. The apparatus of claim 12, further comprising a reservoir to be in fluid communication with the cutting tool assembly.

14. The apparatus of claim 13, further comprising the coolant, the reservoir containing the coolant.

15. A method, comprising:

rotating a cutting tool assembly comprising a tool holder and a face mill, wherein the face mill comprises a longitudinal axis and face mill coolant passages, and wherein each of the face mill coolant passages comprise a first portion and a second portion, the first portions extend radially from a central bore of the face mill, and the second portions extend substantially parallel relative to the longitudinal axis, wherein the face mill comprises a circumferential surface and the first portion of the face mill coolant passages each have an opening at the circumferential surface that receive a corresponding plug;

flowing coolant into a central coolant passage of an elongate body of the tool holder, the tool holder comprising the elongate body comprising a flange and a sleeve extending from the flange, the elongate body comprising the central coolant passage, a plurality of sleeve coolant passages, and a distal end, the sleeve coolant passages are fluidly coupled to the central coolant passage and each have sleeve openings at the distal end;

flowing the coolant from the sleeve coolant passages into the face mill coolant passages of the face mill, the face mill coolant passages fluidly coupled to the central bore, and the face mill comprising a cutting face comprising a plurality of circumferentially spaced teeth and gaps between the teeth, wherein each face mill coolant passage comprises an opening at a corresponding gap; and spraying the coolant out of nozzles at each opening of the face mill coolant passages.

16. The method of claim 15, further comprising milling a work piece with the face mill.

17. The method of claim 16, wherein spraying the coolant out of nozzles at each opening of the face mill coolant passages comprises spraying the coolant onto a cutting surface of the workpiece.

18. The method claim 16, further comprising enabling a temperature of the workpiece to be at or below a threshold temperature while milling the workpiece.

19. The method of claim 18, wherein the temperature is room temperature.

20. The method of claim 18, wherein the temperature is 10° above room temperature.

* * * * *